US012172332B2

(12) United States Patent
Wu

(10) Patent No.: US 12,172,332 B2
(45) Date of Patent: Dec. 24, 2024

(54) BLADE HOLDER WITH REPLACEABLE BLADE

(71) Applicant: GIGAND COMPANY LTD., New Taipei (TW)

(72) Inventor: Chien-Hsin Wu, New Taipei (TW)

(73) Assignee: GIGAND COMPANY LTD., New Taipei (TW)

( * ) Notice: Subject to any disclaimer, the term of this patent is extended or adjusted under 35 U.S.C. 154(b) by 246 days.

(21) Appl. No.: 17/897,500

(22) Filed: Aug. 29, 2022

(65) Prior Publication Data

US 2024/0066724 A1 Feb. 29, 2024

(51) Int. Cl.
*B26B 5/00* (2006.01)
*B26B 1/04* (2006.01)

(52) U.S. Cl.
CPC . *B26B 5/00* (2013.01); *B26B 1/04* (2013.01)

(58) Field of Classification Search
CPC ........... B26B 1/04; B26B 1/044; B26B 1/048; B26B 1/10; B26B 5/00; B26B 5/005; B26B 5/007
See application file for complete search history.

(56) References Cited

U.S. PATENT DOCUMENTS

| | | | | |
|---|---|---|---|---|
| 11,090,820 | B1 | 8/2021 | Wu | |
| 2009/0119926 | A1* | 5/2009 | Nenadic | B26B 1/04 7/118 |
| 2017/0151682 | A1* | 6/2017 | Cheng | B26B 5/00 |
| 2019/0217489 | A1 | 7/2019 | Cheng | |

* cited by examiner

*Primary Examiner* — Jennifer S Matthews
(74) *Attorney, Agent, or Firm* — MUNCY, GEISSLER, OLDS & LOWE, P.C.

(57) ABSTRACT

The invention provides a blade holder with a replaceable blade. The replaceable blade is provided with at least one first hole and a second hole. The blade holder comprises a supporting base, a positioning column, a convex column, and a blade limiting component. The supporting base comprises a plurality of plates. The blade limiting component comprises a limiting rod arranged on the supporting base and a catch plate assembled with the limiting rod. The catch plate is provided with a track matched with the convex column, and moves relative to the supporting base with the limiting rod as a pivot. The limiting rod penetrates through the second hole and is fixed on the catch plate to rotate when the catch plate moves, thereby switching between a first position allowing separation of the second hole and a second position limiting the separation of the second hole.

6 Claims, 7 Drawing Sheets

BLADE HOLDER WITH REPLACEABLE BLADE

FIELD OF THE INVENTION

The invention relates to a blade holder, in particular to a blade holder with a replaceable blade.

BACKGROUND OF THE INVENTION

The U.S. Pat. No. 11,090,820B1 (applied by the applicant of the present invention) discloses a blade holder for assembling a replaceable blade thereon. The blade holder comprises a supporting base and a mounting rod, which are manufactured integrally. However, the mounting rod is a long strip-shaped structure, and is easy to fall into a state of being non-straight or deviating from a design standard due to different shrinkage degrees of materials caused by environmental factors during integral manufacturing. Once this problem occurs, the subsequent assembling of blade and the problems about assembling will be affected, so the semi-finished products with this problem need to be eliminated, thereby increasing the manufacturing cost. Except that the supporting base and the mounting rod are manufactured integrally in U.S. Pat. No. 11,090,820B1, the same manufacturing method is adopted in US2019/0217489.

On the other hand, the conventional blade limiting structure for limiting the displacement of the blade is only applicable to the above-mentioned patents, but is unable to apply to other types of the blade holder; and the structure of the conventional blade limiting structure is relatively complicated.

SUMMARY OF THE INVENTION

A main objective of the present invention is to solve a problem of tolerance easily derived when conventional structures are manufactured integrally.

The other objective of the present invention is to solve a problem that a conventional blade limiting structure is complicated.

To achieve the above objectives, the invention provides a blade holder with a replaceable blade, wherein the replaceable blade is provided with at least one first hole and a second hole spaced from the at least one first hole. The blade holder comprises a supporting base, at least one positioning column, a convex column, and a blade limiting component. The supporting base is provided with a blade bearing surface, a blade backing surface and a through hole connecting the blade bearing surface with the blade backing surface, wherein the supporting base is formed by stacking two plates with different shapes. The at least one positioning column is arranged on the blade bearing surface and provides for the first hole to be assembled therewith, and the at least one positioning column and the through hole are located at the same plate from one of the two plates. The convex column is arranged on the blade backing surface. The blade limiting component comprises a limiting rod penetrating through the through hole, and a catch plate located on the blade backing surface and assembled with the limiting rod, wherein the catch plate is provided with a track matched with the convex column, and the limiting rod is a pivot of the catch plate and the catch plate moves relative to the supporting base upon subjecting to an external force, and wherein the limiting rod passes through the second hole and comprises a limiting head part exposed on the blade bearing surface, and the limiting rod is fixed on the catch plate and rotates when the catch plate moves to be switched between a first position that allows the second hole of the blade being separated therefrom and a second position that limits the second hole from being separated.

In one embodiment, the replaceable blade comprises a plurality of first holes, one of the plurality of first holes comprises a wide opening section and a narrow opening section communicated with the wide opening section, and wherein the blade holder comprises a plurality of positioning columns, one of the plurality of positioning columns comprises a positioning head part and a neck part connected with the positioning head part, and when the neck part is located at the narrow opening section, the positioning head part limits the replaceable blade being separated from the blade holder.

In one embodiment, the limiting head part comprises two first sides parallel to each other, the second hole comprises two second sides parallel to each other, and when the limiting head part is located at the first position, the two first sides are parallel to the two second sides of the second hole.

In one embodiment, the limiting head part is provided with a limiting block and a linking block, the limiting block extends out of the second hole and is in contact with a surface of the replaceable blade, the linking block is connected with the limiting block and moves in the second hole.

In one embodiment, the second hole comprises a hole-expanding portion for the linking block being moved therein.

In one embodiment, the supporting base comprises an accommodating hole and a ball plunger arranged in the accommodating hole, and the catch plate is provided with two positioning holes arranged at intervals and respectively located at the first position and the second position for the ball plunger being clamped therein.

Accordingly, compared with the prior art, the invention has the following characteristics: the supporting base of the invention is formed by stacking two plates with different shapes, so as to solve the problem that the assembling of the blade is easily affected by tolerance resulted from processing parameters or external factors during conventional integral manufacturing. On the other hand, the structure of the blade limiting component of the invention is simpler than the conventional technique.

DETAILED DESCRIPTION OF THE PREFERRED EMBODIMENTS

The detailed description and the technical content of the invention are described in cooperation with the drawings as follows.

Figure 6:
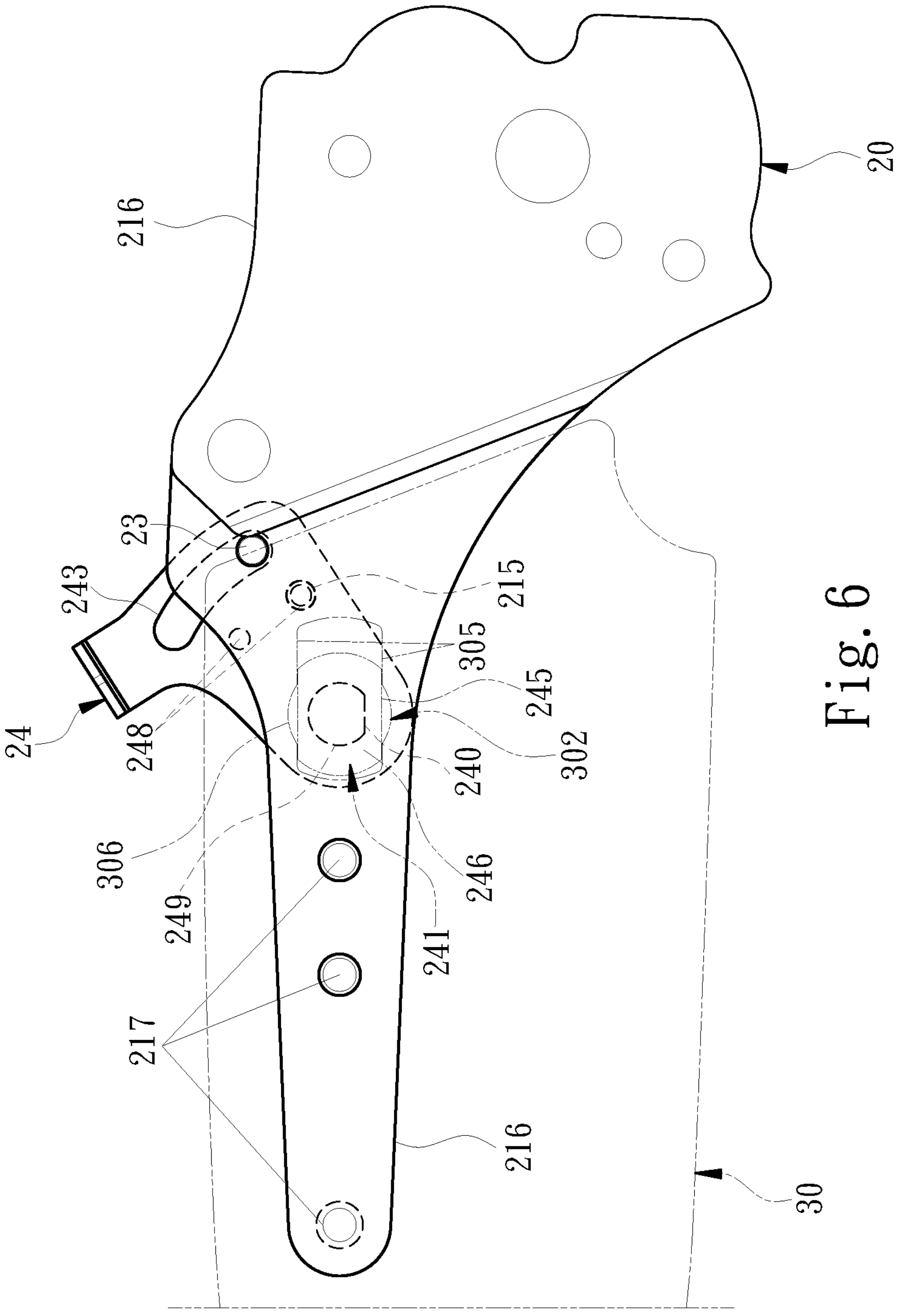
FIG. 6 is a first schematic diagram of implementation of the invention.
Figure 7:
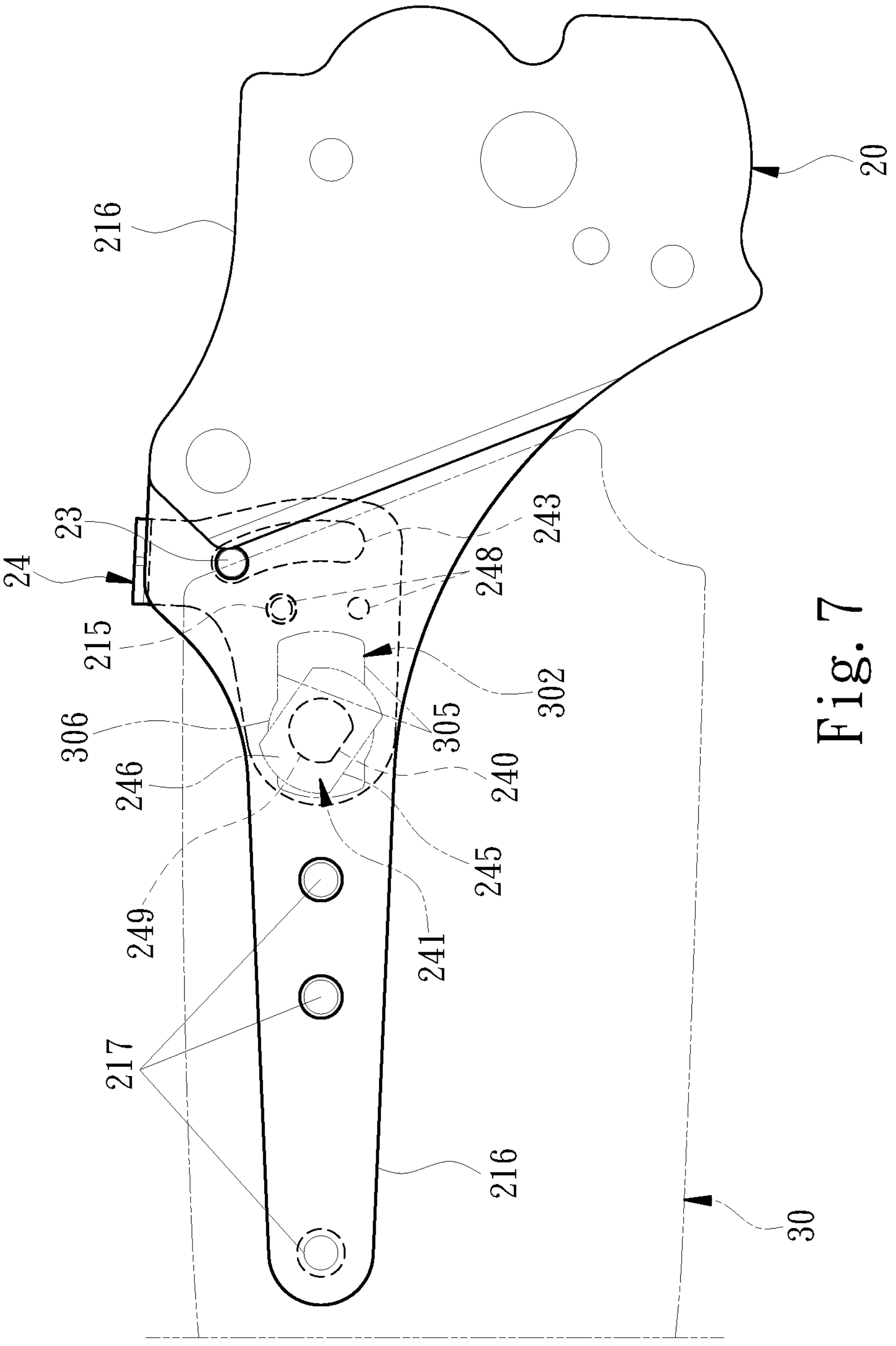
FIG. 7 is a second schematic diagram of the implementation of the invention.

Referring to FIG. 1, FIG. 2, FIG. 3, FIG. 4 and FIG. 5, the invention provides a blade holder 20 with a replaceable blade. A blade 30 matched with the blade holder 20 of the invention may be replaced according to application or blade surface state. In one embodiment, the blade holder 20 is assembled with a blade handle 40. The blade holder 20 comprises a supporting base 21, at least one positioning column 22 arranged on the supporting base 21, a convex column 23 arranged on the supporting base 21, and a blade limiting component 24 arranged on the supporting base 21. The supporting base 21 comprises a blade bearing surface 211 and a blade backing surface 212 defined by the assembling of the blade 30, and the supporting base 21 is further provided with a through hole 213 connecting the blade bearing surface 211 with the blade backing surface 212. Furthermore, the at least one positioning column 22 is arranged on the blade bearing surface 211, and the convex column 23 is arranged on the blade backing surface 212. The blade limiting component 24 comprises a limiting rod 241 penetrating through the through hole 213, and a catch plate 242 located on the blade backing surface 212 and assembled with one end of the limiting rod 241 exposed on the blade backing surface 212. The catch plate 242 is provided with a track 243 matched with the convex column 23, and the limiting rod 241 is an axis of the catch plate 242, upon subjecting to an external force, to move relative to the supporting base 21. Referring to FIG. 6 and FIG. 7, in a state that the blade 30 is assembled, a portion that a user can apply a force on the catch plate 242 is one side of the blade holder 20 opposite to a blade back of the blade 30. When the catch plate 242 is forced to move, the track 243 cooperates with the convex column 23, so that a movement range of the catch plate 242 is limited by the track 243. Furthermore, two ends of the limiting rod 241 are respectively exposed on the blade bearing surface 211 and the blade backing surface 212. One end of the limiting rod 241 exposed on the blade bearing surface 211 is provided with a limiting head part 244, the other end of the limiting rod 241 exposed on the blade backing surface 212 is arranged on the catch plate 242. More specifically, the limiting rod 241 is unable to rotate relative to the catch plate 242 after the limiting rod 241 is fixed on the catch plate 242. However, the limiting rod 241 will rotate when the catch plate 242 moves relative to the supporting base 21, and the limiting rod 241 will be switched from a first position to a second position, wherein the first position and the second position are defined by the limiting head part 244 of the limiting rod 241. In cooperation the limiting rod 241 with the blade 30, when the limiting head part 244 of the limiting rod 241 is located at the first position, the blade 30 is able to be separated from the supporting base 21; on the contrary, when the limiting head part 244 of the limiting rod 241 is located at the second position, the blade 30 is limited and is unable to be separated from the supporting base 21.

Figure 1:
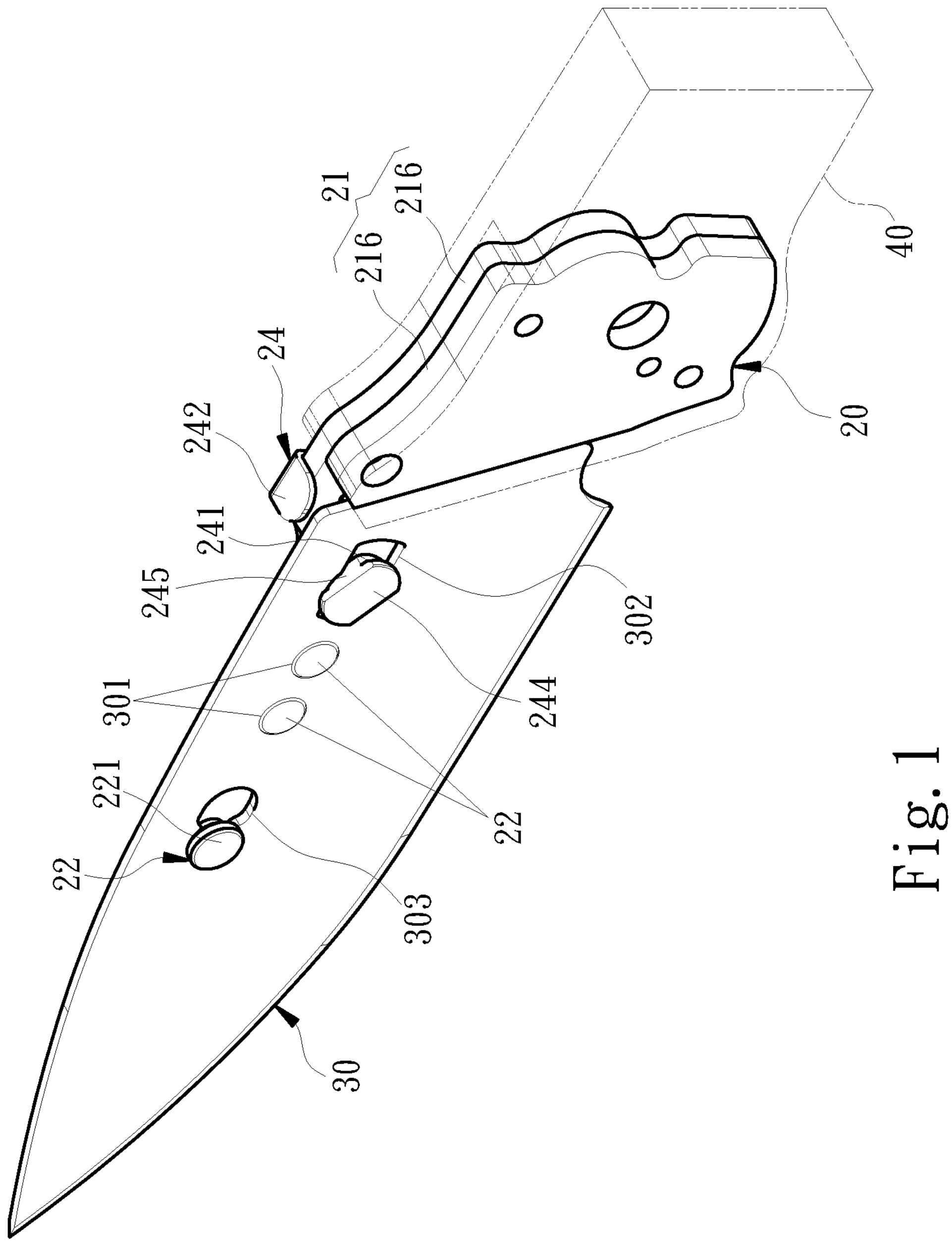
FIG. 1 is a schematic diagram of a structure of the invention.
Figure 2:
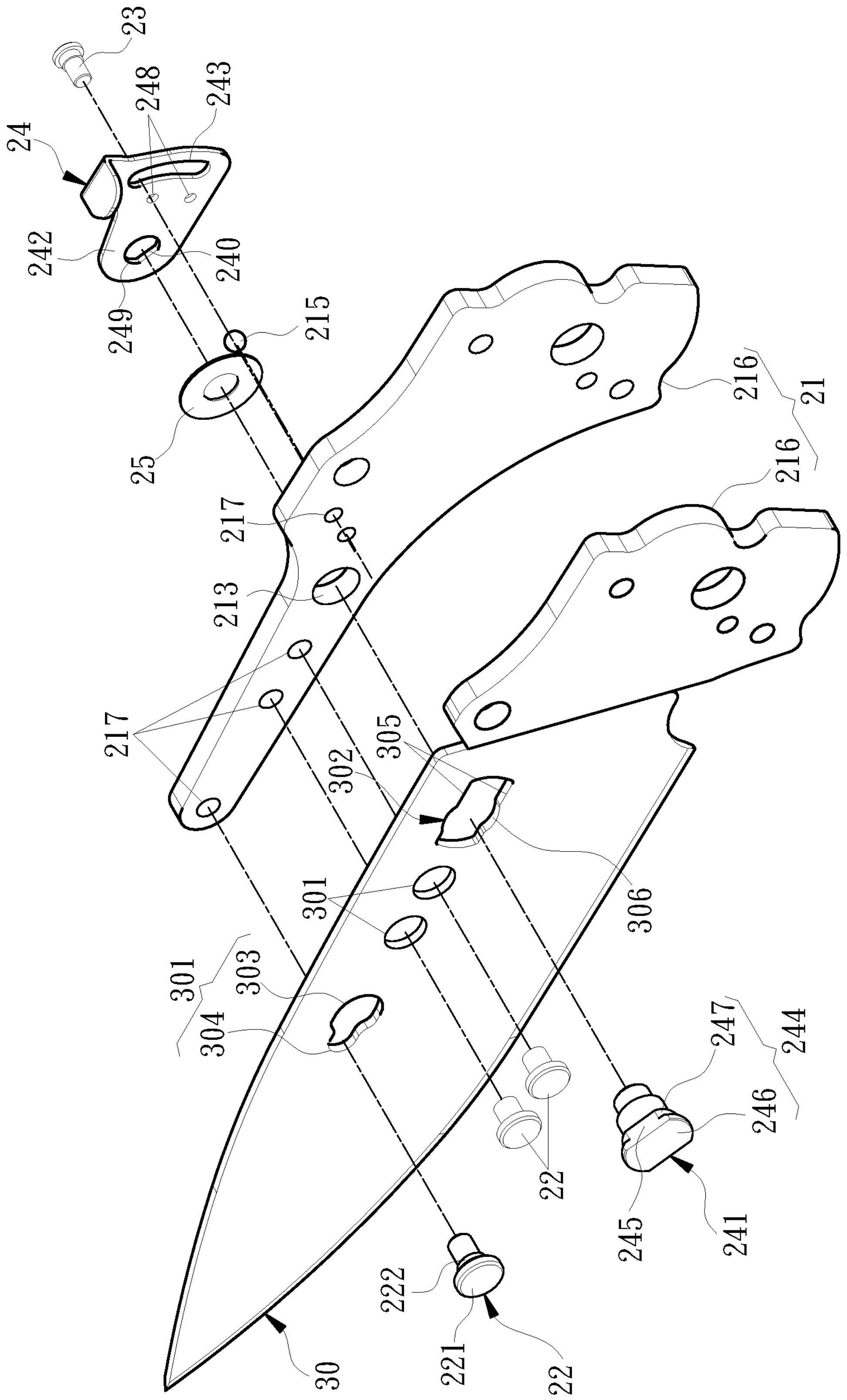
FIG. 2 is an exploded schematic diagram of the structure of the invention.
Figure 3:
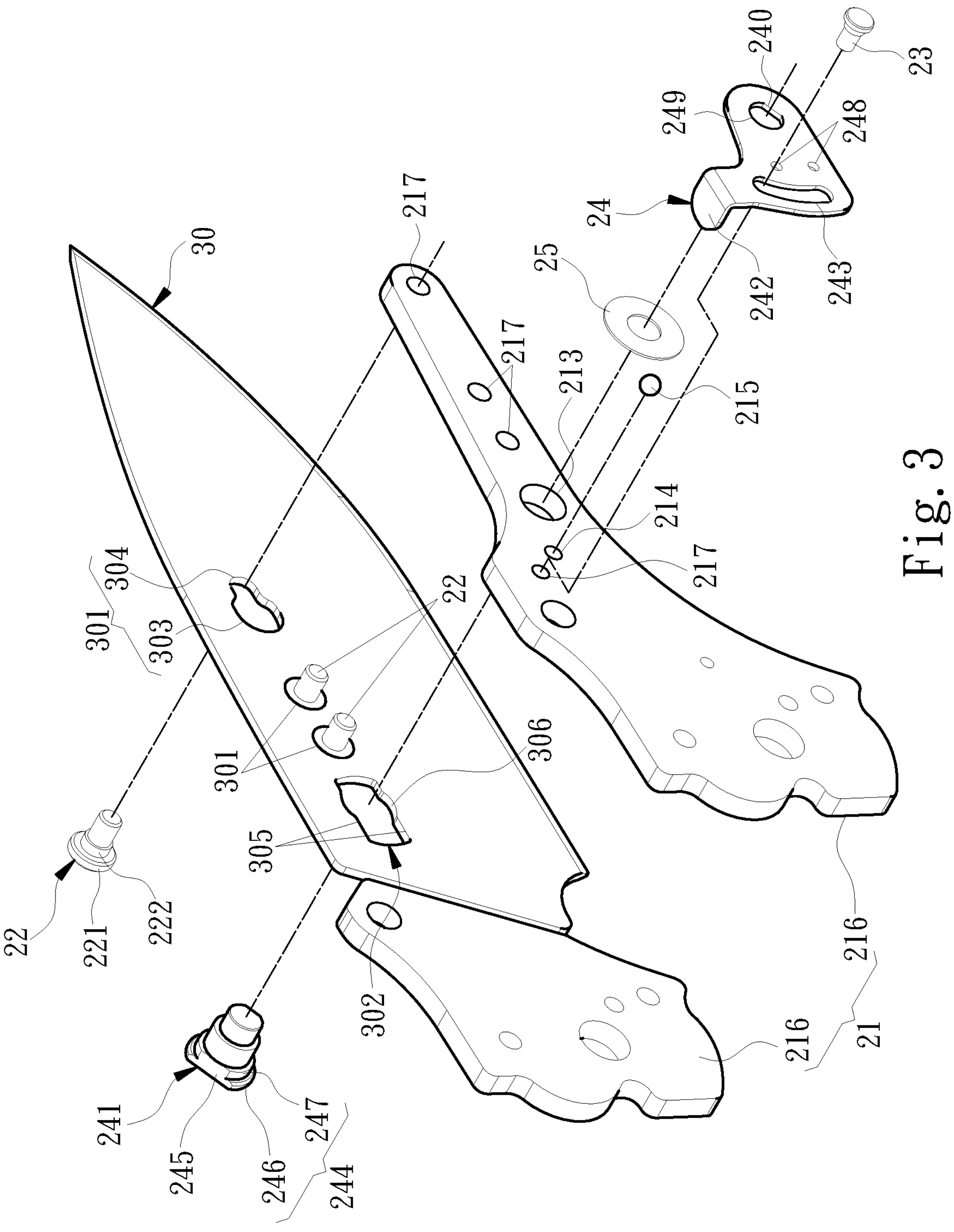
FIG. 3 is an exploded schematic diagram of the structure in another direction of the invention.

Referring to FIG. 1, FIG. 2 and FIG. 3, the blade 30 used in cooperation with the blade holder 20 of the invention is not limited to any purposes. The blade 30 is provided with at least one first hole 301 and one second hole 302 spaced from the first hole 301. Before the blade holder 20 is assembled with the blade 30, the catch plate 242 is located at a position where the limiting rod 241 is located at the first position. When assembling the blade holder 20 with the blade 30, firstly, the at least one first hole 301 is aligned with the at least one positioning column 22, and one end of the limiting rod 241 provided with the limiting head part 244 passes through the second hole 302 of the blade 30. Subsequently, the catch plate 242 is toggled, and the limiting rod 241 is a pivot of the catch plate 242 and is rotated at the same time, so that the limiting rod 241 is switched from the first position to the second position, thereby limiting the blade 30 to be separated from the blade holder 20, and completing the assembling of the blade 30. Disassembling of the blade 30 is a reverse operation of the above description and will not be repeated here.

Referring to FIG. 2 and FIG. 3, in an embodiment, the blade 30 comprises a plurality of first holes 301, and one of the plurality of first holes 301 comprises a wide opening section 303 and a narrow opening section 304 communicated with the wide opening section 303. Furthermore, the blade holder 20 comprises a plurality of positioning columns 22, one of the plurality of positioning columns 22 comprises a positioning head part 221 and a neck part 222 connected to the positioning head part 221 with the supporting base 21, and the width (or radius) of the positioning head part 221 is greater than the width (or radius) of the neck part 222. In this embodiment, when assembling the blade holder 20 with the blade 30, firstly, one of the plurality of first holes 301 of the blade 30 having the wide opening section 303 is aligned with one of the plurality of positioning columns 22 having the positioning head part 221; and then, the blade 30 moves horizontally, so that one of the plurality of positioning columns 22 having the positioning head part 221 is placed in the narrow opening section 304 through the neck part 222. At this time, a bottom edge of the positioning head part 221 is higher than a surface of the blade 30, thereby producing an auxiliary effect of limiting the blade 30 to be separated from the blade holder 20. The plurality of first holes 301 remained are respectively assembled with the plurality of positioning columns 22 remained, and the blade limiting component 24 is assembled with the second hole 302 to complete the assembling of the blade 30.

Figure 4:
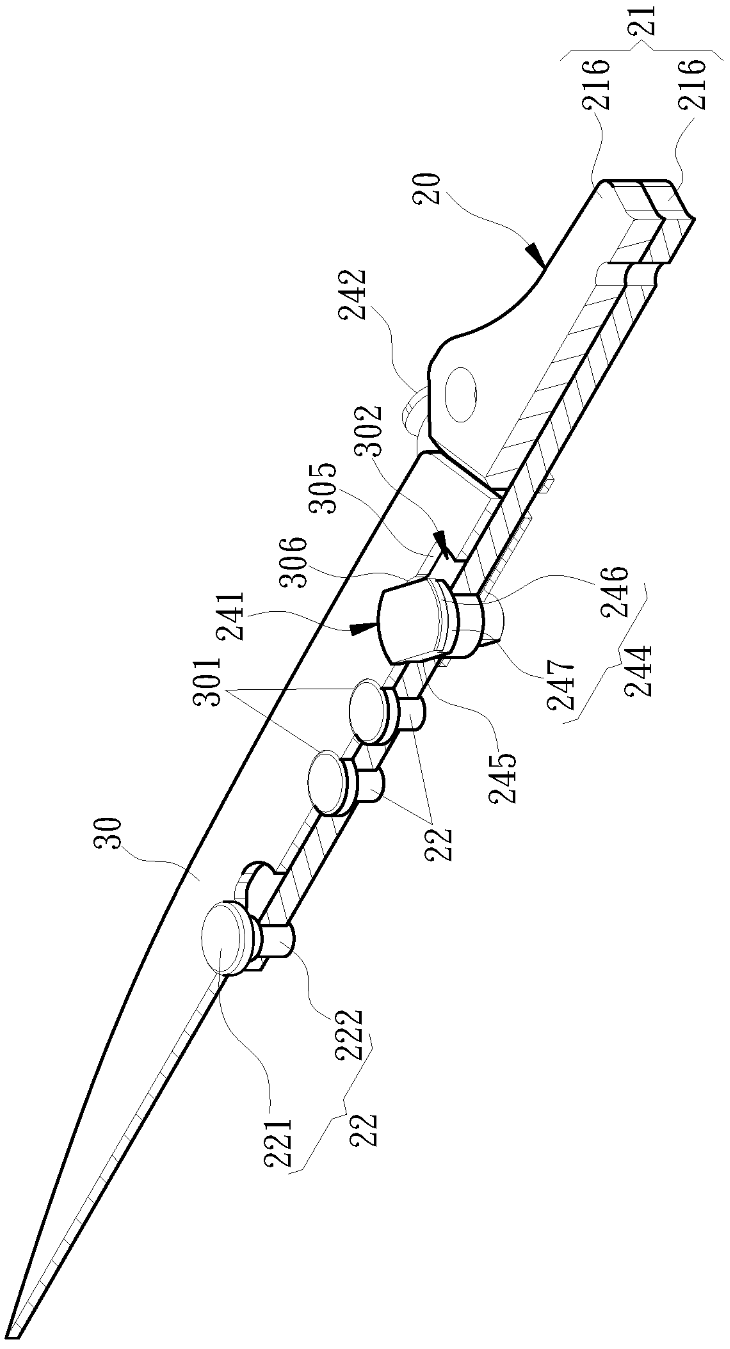
FIG. 4 is a first cross-sectional schematic diagram of the structure of the invention.
Figure 5:
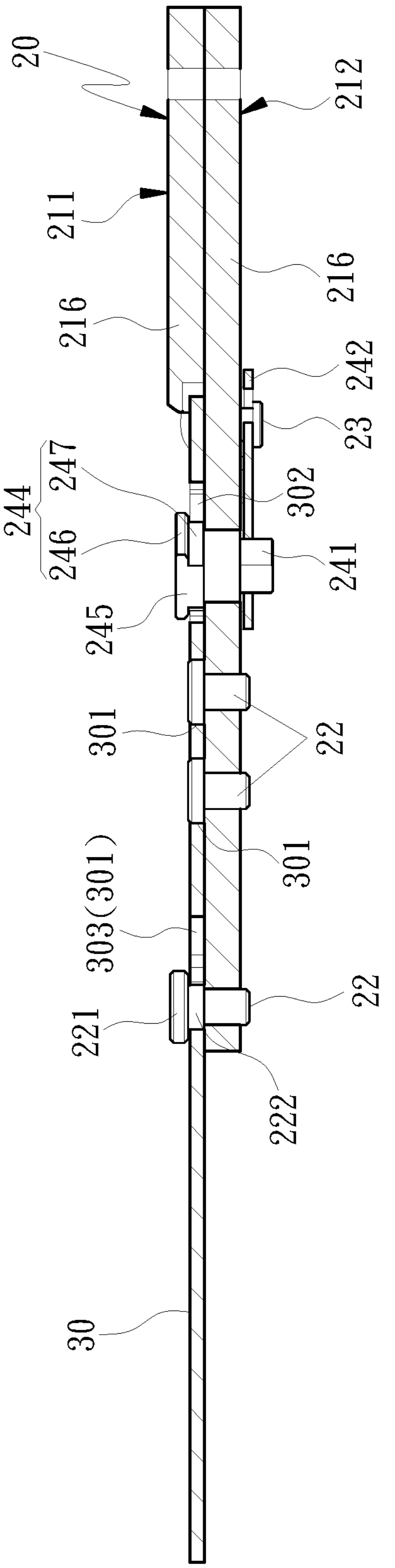
FIG. 5 is a second cross-sectional schematic diagram of the structure of the invention.

Referring to FIG. 2, FIG. 3 and FIG. 4, in an embodiment, the limiting head part 244 comprises two first sides 245 parallel to each other, and the second hole 302 comprises two second sides 305 parallel to each other. When the blade limiting component 24 is located at the first position, the two first sides 245 of the limiting head part 244 are parallel to the two second sides 305 of the second hole 302. In addition, when the blade limiting component 24 is located at the second position, the two first sides 245 of the limiting head part 244 and the two second sides 305 of the second hole 302 are intersected, so that the blade 30 is unable to be separated from the blade holder 20. Furthermore, in an embodiment, the limiting head part 244 is provided with a limiting block 246 and a linking block 247 connected to the limiting block 246. The limiting block 246 is larger than the linking block 247. When the blade holder 20 is assembled with the blade 30, the limiting block 246 extends out of the second hole 302 of the blade 30 and is in contact with the surface of the blade 30, the linking block 247 is located in the second hole 302 and can be rotated therein. Further referring to FIG. 2 and FIG. 3, in an embodiment, the second hole 302 comprises a hole-expanding portion 306 for the linking block 247 being moved therein.

Referring to FIG. 2 and FIG. 3, in an embodiment, the supporting base 21 comprises an accommodating hole 214 and a ball plunger 215 arranged in the accommodating hole 214. The catch plate 242 is provided with two positioning holes 248 arranged at intervals, the two positioning holes 248 are respectively located at the first position and the second position of the limiting rod 241, and the ball plunger 215 is in contact with the catch plate 242, namely, the ball plunger 215 is clamped into the one of the two positioning holes 248, respectively, before and after the catch plate 242 moves, as shown in FIG. 6 and FIG. 7. With this design, the catch plate 242 is unable to move randomly, thereby acting as a locking point and preventing the catch plate 242 from being wrongly displaced.

Further referring to FIG. 2 and FIG. 3, the supporting base 21 of the invention is formed by stacking two plates 216 with different shapes in order to simplify manufacturing of the blade holder 20. The two plates 216 are processed by computer numerical control machines (commonly known as CNC machines), and after manufacturing of the two plates 216 is finalized, a base of the supporting base 21 of the invention is completed by stacking the two plates 216. In detail, the two plates 216 are different in size, a volume of one of the two plates 216 is smaller than that of the other one of the two plates 216, and the smaller one of the two plates 216 abuts against one unedged end of the blade 30 when the supporting base 21 is made and provided for the arrangement of the blade 30. On the other hand, the plurality of positioning columns 22 and the through hole 213 are arranged at the same plate from one of the two plates 216, wherein in one embodiment, the plurality of positioning columns 22 and the through hole 213 are arranged at one of the two plates 216 which has the larger volume. Furthermore, in an embodiment, one of the two plates 216 provided for arrangement of the plurality of positioning columns 22 is formed with a plurality of mounting holes 217, the plurality of mounting holes 217 is provides for arrangement of the plurality of positioning columns 22 and the convex column 23.

Further referring to FIG. 2 to FIG. 3, in an embodiment, the catch plate 242 is formed with a hole 249 for arrangement of the limiting rod 241, and a periphery of the hole 249 comprises a cutting edge 240. On the other hand, a configuration of one end of the limiting rod 241 for assembling the catch plate 242 corresponds to the hole 249, thereby limiting the limiting rod 241 from rotating independently relative to the catch plate 242.

Further referring to FIG. 2 and FIG. 3, in an embodiment, the blade holder 20 is provided with a gasket 25, which is located between the supporting base 21 and the catch plate 242 for the limiting rod 241 passing.

What is claimed is:

1. A blade holder with a replaceable blade, wherein the replaceable blade comprises at least one first hole and a second hole spaced from the at least one first hole, the blade holder comprising:

a supporting base, comprising a blade bearing surface, a blade backing surface and a through hole connecting the blade bearing surface with the blade backing surface, wherein the supporting base comprises two plates stacked with different shapes;

at least one positioning column, penetrating through the blade bearing surface into the at least one first hole, wherein the at least one positioning column and the through hole are located on one of the two plates;

a convex column, arranged on the blade backing surface; and a blade limiting component, comprising a limiting rod penetrating through the through hole, and a catch plate located on the blade backing surface, the limiting rod, fixed on the catch plate, wherein the catch plate is provided with a track matched with the convex column, and the limiting rod is a pivot of the catch plate and the catch plate moves relative to the supporting base upon subjecting to an external force, and wherein the limiting rod passes through the second hole and comprises a limiting head part exposed on the blade bearing surface, and the limiting rod rotates when the catch plate moves to be switched between a first position that allows the second hole of the blade being separated therefrom and a second position that limits the second hole from being separated.

2. The blade holder with the replaceable blade according to claim 1, wherein the replaceable blade comprises a plurality of first holes, one of the plurality of first holes comprises a wide opening section and a narrow opening section communicated with the wide opening section, and wherein the blade holder comprises a plurality of positioning columns, one of the plurality of positioning columns comprises a positioning head part and a neck part connected with the positioning head part, and when the neck part is located at the narrow opening section, the positioning head part limits the replaceable blade being separated from the blade holder.

3. The blade holder with the replaceable blade according to claim 2, wherein the limiting head part comprises two first sides parallel to each other, the second hole comprises two second sides parallel to each other, and when the limiting head part is located at the first position, the two first sides are parallel to the two second sides of the second hole.

4. The blade holder with the replaceable blade according to claim 3, wherein the limiting head part is provided with a limiting block and a linking block, the limiting block extends out of the second hole and is in contact with a surface of the replaceable blade, the linking block is connected with the limiting block and moves in the second hole.

5. The blade holder with the replaceable blade according to claim 4, wherein the second hole comprises a hole-expanding portion for the linking block being moved therein.

6. The blade holder with the replaceable blade according to claim 3, wherein the supporting base comprises an accommodating hole and a ball plunger arranged in the accommodating hole, and the catch plate is provided with two positioning holes arranged at intervals and respectively located at the first position and the second position for the ball plunger being clamped therein.

* * * * *